(12) United States Patent
Hueftle et al.

(10) Patent No.: US 7,171,865 B2
(45) Date of Patent: Feb. 6, 2007

(54) DEVICE FOR DETERMINING AT LEAST ONE PARAMETER OF A MEDIUM FLOWING IN A CONDUIT

(75) Inventors: Gerhard Hueftle, Aspach (DE); Hans Beyrich, Freiberg/N (DE); Bernd Kuenzl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 10/843,020

(22) Filed: May 11, 2004

(65) Prior Publication Data

US 2004/0244511 A1 Dec. 9, 2004

(30) Foreign Application Priority Data

May 16, 2003 (DE) ............................. 103 22 124

(51) Int. Cl.
*G01P 1/00* (2006.01)
(52) U.S. Cl. .................................... 73/866.5
(58) Field of Classification Search .............. 73/661, 73/198, 201, 756, 86, 866.5, 32 A; 374/208, 374/147, 148
See application file for complete search history.

(56) References Cited

U.S. PATENT DOCUMENTS

| | | | | |
|---|---|---|---|---|
| 4,481,806 A | * | 11/1984 | Schad | 73/1.22 |
| 4,598,581 A | * | 7/1986 | Brekke | 73/117.3 |
| 4,662,232 A | * | 5/1987 | Gonsalves et al. | 73/866.5 |
| 5,090,237 A | * | 2/1992 | Schrumpf et al. | 73/146.5 |
| 5,211,677 A | * | 5/1993 | Sargeant et al. | 73/61.71 |
| 5,733,044 A | * | 3/1998 | Rose et al. | 374/144 |
| 6,439,058 B1 | * | 8/2002 | Aratani et al. | 73/756 |
| 6,543,282 B1 | | 4/2003 | Thompson | |
| 6,814,486 B2 | * | 11/2004 | Sidoni | 374/208 |

FOREIGN PATENT DOCUMENTS

| | | |
|---|---|---|
| DE | 44 26 101 | 1/1996 |
| EP | 0 908 704 A1 | 4/1999 |

* cited by examiner

*Primary Examiner*—Robert Raevis
(74) *Attorney, Agent, or Firm*—Michael J. Striker

(57) ABSTRACT

A device for determining at least one parameter of a medium which flows in a conduit has a fluid conduit part having a wall which forms a fluid conduit passage and has an insertion opening, a plug sensor having a sensor element, an insertion portion which is inserted through the insertion opening of the wall into the fluid conduit passage, an electrical connection portion which is not inserted into the fluid conduit passage, and a stop surface which abuts against a stop surface of the fluid conduit part, and mounting means for mounting the plug sensor on the fluid conduit part, the mounting means including a holding part which is pushed substantially perpendicular to an insertion direction of the plug sensor onto a connecting pipe of the fluid conduit part which surrounds the insertion opening, the holding part having at least one first portion abutting against a supporting surface of the connecting pipe and at least one second portion applying a pretensioning force to a securing surface of the plug sensor which faces away from the insertion portion of the plug sensor, so that a stop surface of the plug sensor abuts against the stop surface of the fluid conduit part.

10 Claims, 8 Drawing Sheets

DEVICE FOR DETERMINING AT LEAST ONE PARAMETER OF A MEDIUM FLOWING IN A CONDUIT

BACKGROUND OF THE INVENTION

The present invention relates to a device for determining at least one parameter of a medium which flows in a conduit.

Devices of the above mentioned general type are used for determining, for example, the air mass flow in a suction track of an internal combustion engine as disclosed in German document DE 44 26 101 A1. In the known device a plug sensor which is inserted in a plug opening of a fluid conduit part is fixed by screws of the fluid conduit part.

SUMMARY OF THE INVENTION

Accordingly, it is an object of the present invention to provide a device for determining at least one parameter of a medium flowing in a conduit, which is a further improvement of the existing devices of this type.

In keeping with these objects and with others which will become apparent hereinafter, one features of the present invention resides, briefly stated, in a device for determining at least one parameter of a medium flowing in a conduit, a fluid conduit part having a wall which forms a fluid conduit passage and has an insertion opening; a plug sensor having a sensor element, an insertion portion which is inserted through said insertion opening of said wall into said fluid conduit passage, an electrical connection portion which is not inserted into said fluid conduit passage, and a stop surface which abuts against a stop surface of said fluid conduit part; and mounting means for mounting said plug sensor on said fluid conduit part, said mounting means including a holding part which is pushed substantially perpendicular to an insertion direction of said plug sensor onto a connecting pipe of said fluid conduit part which surrounds said insertion opening, said holding part having at least one first portion abutting against a supporting surface of said connecting pipe and at least one second portion applying a pretensioning force to a securing surface of said plug sensor which faces away form said insertion portion of said plug sensor, so that a stop surface of said plug sensor abuts against said stop surface of said fluid conduit part.

When the device for determining at least one parameter of a medium which flows in a conduit is designed in accordance with the present invention, the plug sensor can be mounted fast and reliably on the fluid conduit part with a holding part which is fittable on a connecting pipe of the fluid conduit part. The mounting of the plug sensor is limited to several steps which are simple to perform. For mounting of the plug sensor on the fluid conduit part it suffices to push the holding part, after insertion of the plug sensor into the plug opening laterally, onto the connecting pipe. The holding part can be produced in a very price-favorable manner, for example as a punched bent part or a spring wire bracket. On the plug sensor only a securing surface, but no special mounting means is needed, so that the use of the plug sensor is independent from the concrete design of the holding part, and the plug sensor can be also inserted otherwise.

Advantageously the holding part has at least one leg which engages the securing surface of the plug sensor. It is inserted substantially perpendicular to the insertion direction of the plug sensor in the guiding means of the connecting pipe. While the holding part needs only one leg, in a preferable embodiment the holding part can have two legs which are connected with one another through a connecting web. It is especially advantageous when a securing part arranged on the connecting pipe is provided, which is engageable with the leg of the holding part inserted into the guiding means, so that the holding part is secured against pulling out from the connecting part. An accidental slipping out of the holding part is reliably prevented.

Since the securing part is non-releasably mounted on the connecting pipe, advantageously the plug sensor can be removed from the insertion opening only with simultaneous destruction of the mounting means. An unauthorized manipulation is thereby advantageously recognizable.

The novel features which are considered as characteristic for the present invention are set forth in particular in the appended claims. The invention itself, however, both as to its construction and its method of operation, together with addition objects and advantages thereof, will be best understood from the following description of specific embodiments when read in connection with the accompanying drawings.

BRIEF DESCRIPTION OF THE DRAWINGS

FIGS. 1–5 show a first embodiment of the present invention, while FIG. 6a–11 show a second embodiment of the invention, wherein

FIG. 3 is a view showing a fluid conduit part of the device in accordance with the first embodiment of the present invention without a plug sensor;

FIG. 5 is a view showing the plug sensor for the first and second embodiments;

FIGS. 6a–6d are views showing a safety part of the device in accordance with the second embodiment; wherein FIG. 6c is a view showing a section taken along the line A—A in FIG. 6d;

FIG. 6d is a view showing a section taken along the line B—B;

FIG. 8 is a view showing a fluid conduit part of the device in accordance with the second embodiment without a plug sensor;

DESCRIPTION OF THE PREFERRED EMBODIMENTS

Figure 3:
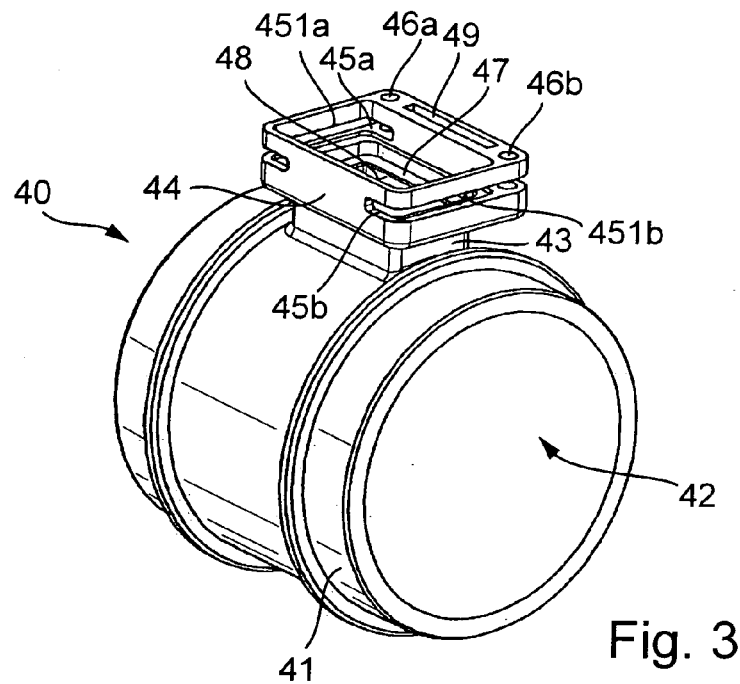

FIG. 3 shows a fluid conduit part 40, which is arranged for example in a suction track of an internal combustion engine. The fluid conduit part 40 is formed for example as a cylindrical part with a cylindrical wall 41 surrounding a fluid conduit passage 42. During the operation air flows through the fluid conduit passage 42. The fluid conduit part can be provided with a not shown filter and for example mounted as an air filter box insert in the suction conduit. The wall 41 has an insertion opening 48 which is surrounded by a connecting pipe 43, for insertion of a plug sensor. The connecting pipe has a collar-shaped flange 44, with two slots 45a, 45b formed as guiding means for a holding part 20.

Figure 5:
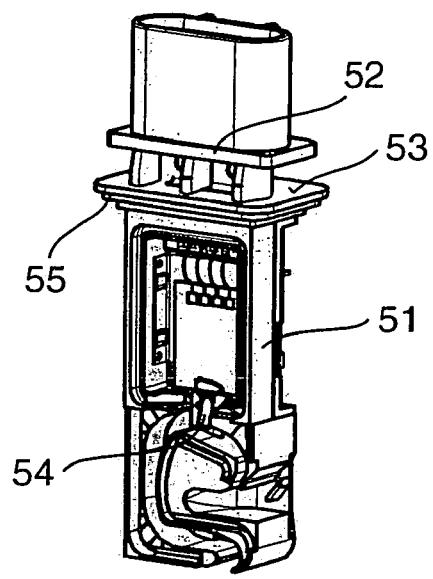
Figure 6A:
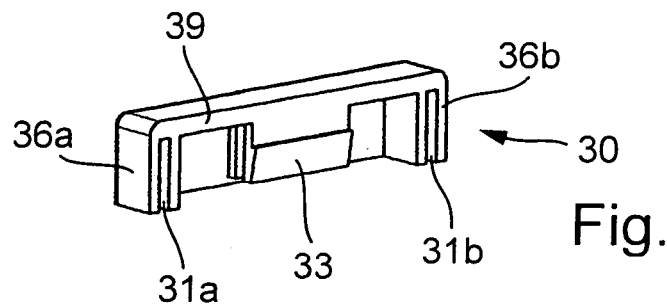
Figure 6B:
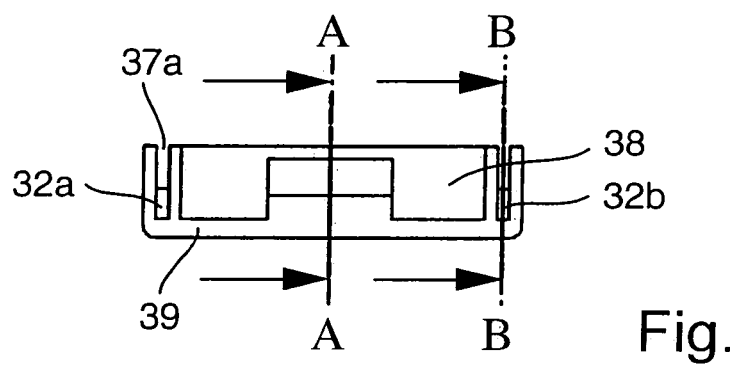
Figure 6C:
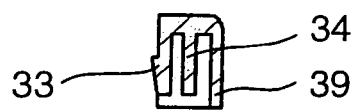
Figure 6D:
Figure 7A:
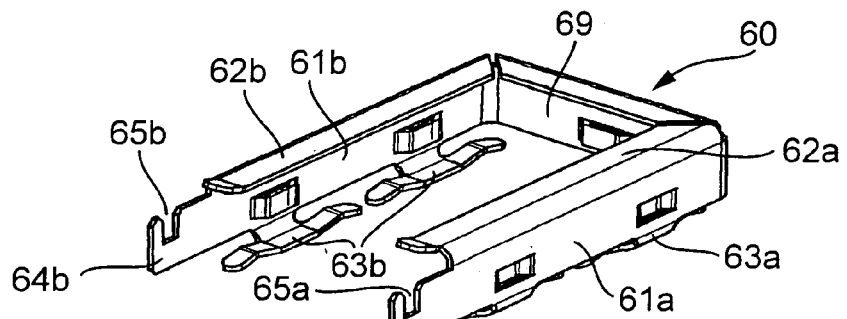
FIGS. 7a–7d are views showing a holding part of the device in accordance with the second embodiment.
Figure 7B:
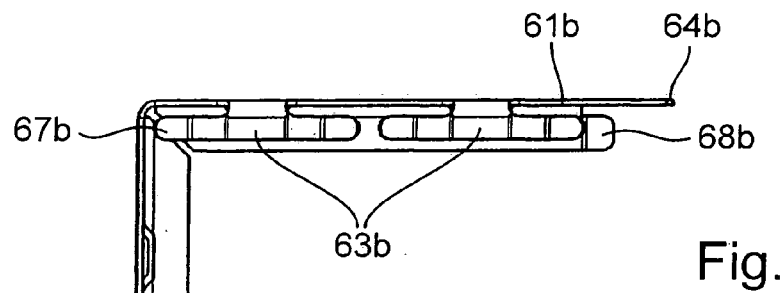
Figure 7C:
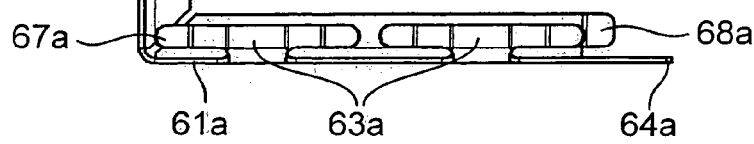
Figure 7D:
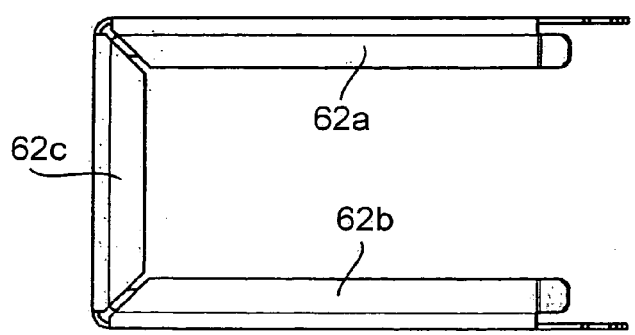

FIG. 5 shows a plug sensor 50 with a removed cover part. It is formed for example as an air mass sensor which detects a flowing air as a parameter of the mass flow rate in the fluid conduit passage 42. Naturally, other sensors can be used as well which detect other parameters of the medium that flows in the conduit. The medium can be liquid or gaseous.

The plug sensor 50 has an insertion portion 51 with a bypass passage, in which the sensor element 54 is arranged. The sensor element is connected with an electronic evaluating circuit arranged in the plug sensor, whose connections lead to an electrical connecting portion 52 of the plug sensor for connecting to an external connector. The plug sensor has a circumferential collar provided between the insertion portion 51 and the connection port 52. Its lower surface forms a stop surface 55 for placement on a stop surface 47 of the fluid conduit part 40, and its upper surface forms a securing surface 53 for abutment of a holding part, which will be described herein below.

Figure 1A:
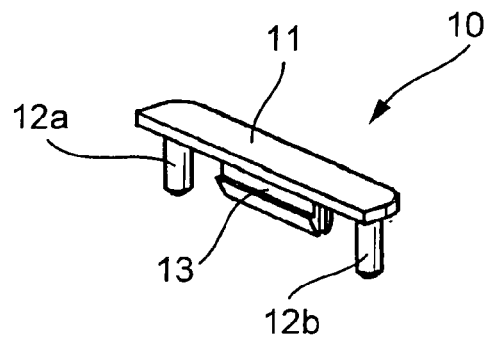
FIGS. 1a–1d illustrate a securing part of the sensor of the device in accordance with the present invention.
Figure 1B:
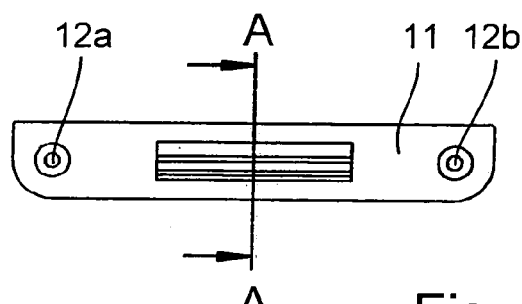
Figure 1C:
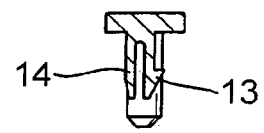
Figure 1D:
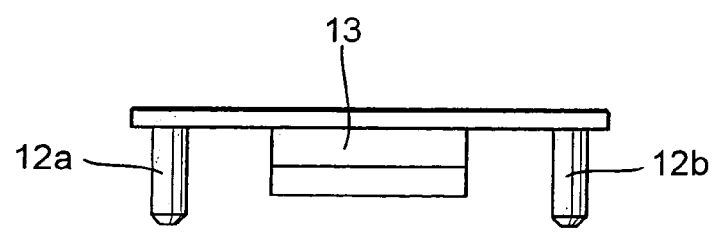
Figure 2A:
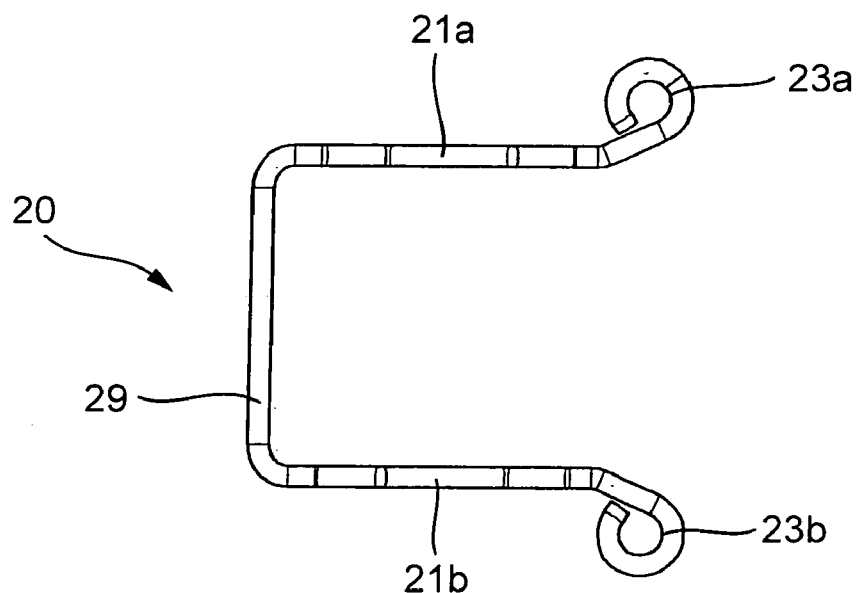
FIGS. 2a–2b views showing a holding part of the device in accordance with the first embodiment of the present invention.
Figure 2B:
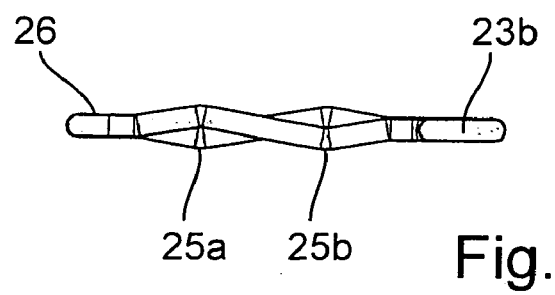

The holding part 20 forms mounting means. It is shown in FIGS. 2a and 2b and formed as a spring wire bracket. The holding part 20 has a connecting web 29, from which two legs 21a, 24b extend in one direction. As can be seen from FIG. 2b, the legs are bent alternatingly and have each at least first portion 26 which is connected with the connecting web 29 and a projecting second portion 25a, 25b. The ends of the legs from holding means 23a, 23b in form of lugs.

Figure 4A:
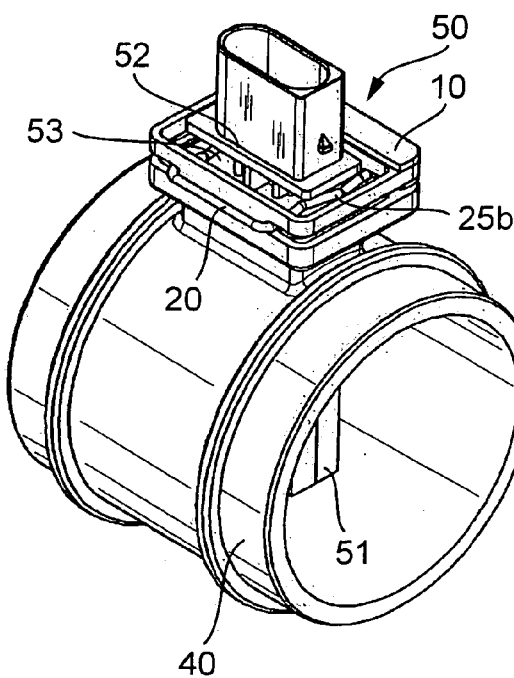
FIGS. 4a–4b are views showing a fluid conduit part with the plug sensor in accordance with the first embodiment of the present invention.
Figure 4B:
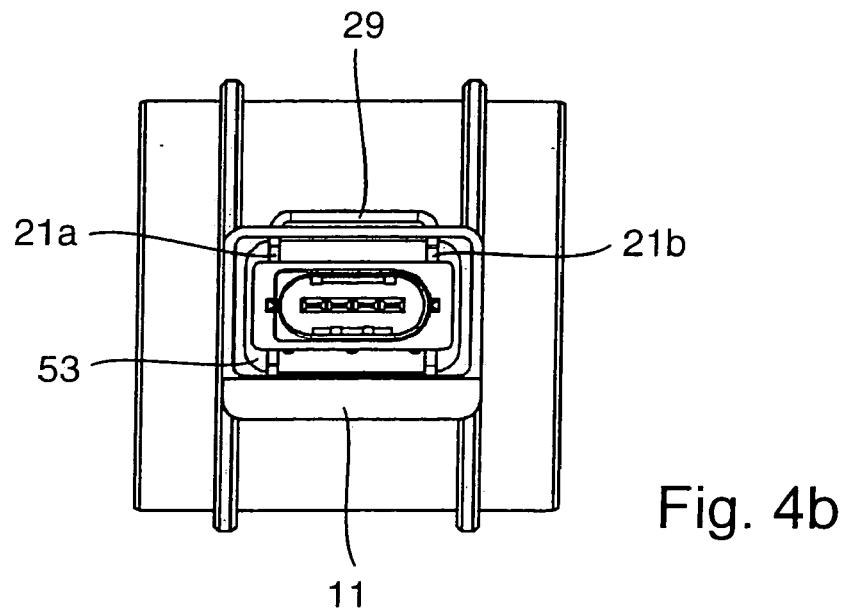

As can be seen from FIGS. 4a and 4b the holding part 20 is inserted with the legs 21a, 21b into the slots 45a, 45b of the collar 44, so that the legs 21a, 21b engage the securing surface 53 of the plug sensor 50 and abuts with the second portions 25a, 25b against the securing surface 53. After the insertion of the holding part 20, the first portion 26a of the legs abuts the against the inner surfaces of the slots 45a, 45b which form supporting surfaces 451a, 451b and face away from the fluid conduit part. The second portion 25a, 25b of the legs is prestressed automatically against the securing surface 53 during insertion, so that the stop surface 53 is pressed by the tension force of the holding part against the stop surface 47.

In the end position of the holding part it abuts preferably with the connecting web 29 against the collar 44, while the holding means 23a, 23b which face away from the connecting web 29 are arranged on the opposite end of the collar 44 in the slots 45a, 45b. The collar 44 has there two throughout going openings 46 which extend in the insertion direction of the plug sensor, and in which the engaging means 12a, 12b of a securing part 10 are insertable. The securing part is not absolutely necessary since the plug sensor is mounted on the fluid conduit passage by the holding part. However, the use of the securing part represents a preferable embodiment.

The securing part 10 is shown in FIGS. 1a–1d. It is formed for example as a synthetic plastic part and has a web 11, from which two pin-shaped engaging means 12, 12b and an arresting hook 13 as well as a leg 14 extend in one direction. The securing part 10 is inserted in the insertion opening of the plug sensor 15 in the upper surface of the collar 44. The engaging means 12a, 12b are inserted in the throughgoing openings 46 and engage in the holding means 23a, 23b of the holding part 20. The arresting hook 13 and the leg 14 are inserted in an opening 49 of the collar until the arresting hook 13 engages a counter arresting means formed in the opening 49 as barbs. In the mounting position shown in FIGS. 4a and 4b the secured part 10 is non releasably connected with the connecting pipe 43 and engages with the lugs of the holding part, so that the latter can not be pulled out from the connecting pipe without destruction of the securing part.

A second embodiment of the invention device is shown in FIGS. 6a–9c. As can be seen from FIG. 8, the fluid conduit part 40 has a connecting pipe 43 provided with a collar-shaped flange 44. The flange has an upper flange surface 44a, and a lower flame surface 44b as guiding means for pushing on of a holding part 60. The inner wall of the connecting pipe 43, as in the first embodiment, has a stop surface 47 surrounding the insertion opening 48 for the plug sensor. The flange 44 is further provided with a lateral projection, in which a an opening 49 is formed. As a plug sensor, the plug sensor of the first embodiment shown in FIG. 5 can be inserted in the insertion opening 48.

The holding part 60 is shown in FIGS. 7a–7d and formed preferably as a punched bent part of sheet metal. The holding part has a U-shaped basic form with two straight legs 61a, 61b and a connecting web 69 which connects the legs. The legs 61a, 61b are bent perpendicularly from the connecting web 69 and are provided with hook-shaped holding means 65a, 65b on their ends 64a, 64b facing away from the connecting web 69. Each leg 61a, 61b is provided with at least one preferably perpendicularly bent first portion 62a, 62b on an upper side and with a preferably perpendicularly bent second portion 63a, 63b on the lower side. The first portions 62a, 62b can be preferably provided with sliding surfaces 68a, 68bb, which facilitate pushing of the holding part 60 onto the flange 44 of the connecting pipe 43. The second portions 63a, 63b of the legs 61a, 61b are provided with spring elements 67b, which are formed of one piece with the second portions 63a, 63b by punching and bending.

Figure 9A:
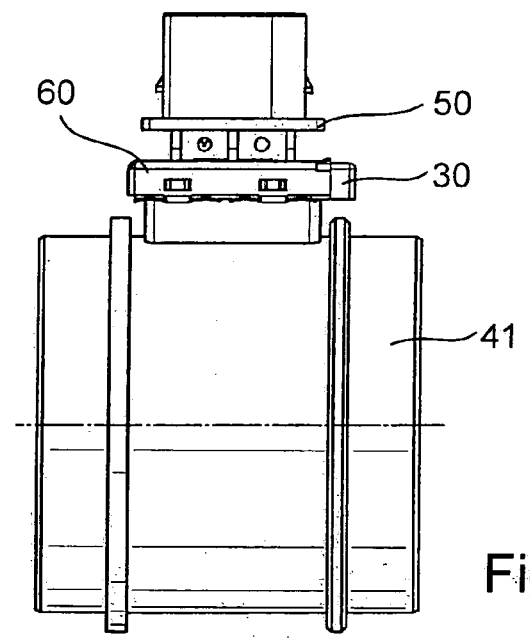
FIGS. 9a, 9b, 9c are views showing a fluid conduit part with the plug sensor for the device in accordance with the second embodiment of the present invention.
Figure 9B:
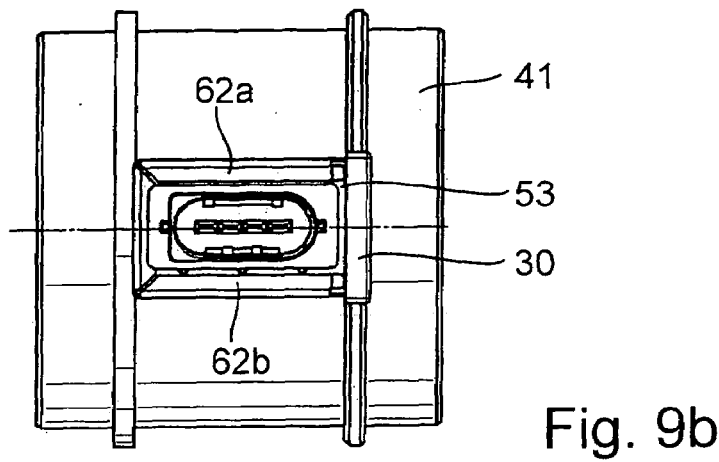
Figure 9C:
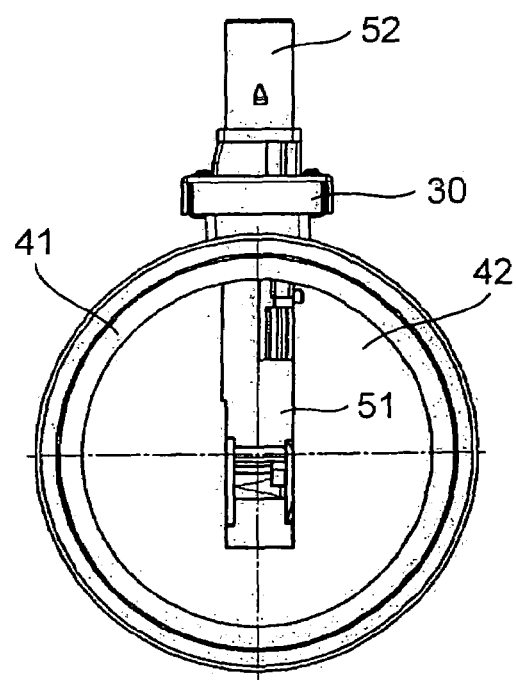

During mounting of the plug sensor 50, it is first inserted into the insertion opening 48 until the stop surface 55 abuts against the stop surface 47. Then the holding part 60 is pushed laterally onto the flange 44, and the first portion 62a, 62b of the leg 61a, 61b slides with the sliding surfaces 68a, 68b over the securing surface 53 of the plug sensor, while the second portions 63a, 63b engage the lower flange surface 44b formed as a supporting surface, and the spring elements 67b are pre-stressed against the lower flange surface 44b, as shown in FIGS. 9a and 9b. By the tension force of the spring element 67b, the first portions 62a, 62b of the legs 61a, 61b are pressed against the ring surface 53, while the plug sensor with the stop surface 55 is pressed against the stop surface 47 and therefore is fixed in the insertion opening 48.

Naturally, it is also possible to provide only the first portions 62a, 62b which slide over the securing surface 53 or both the first and the second portions with the spring elements.

Figure 8:
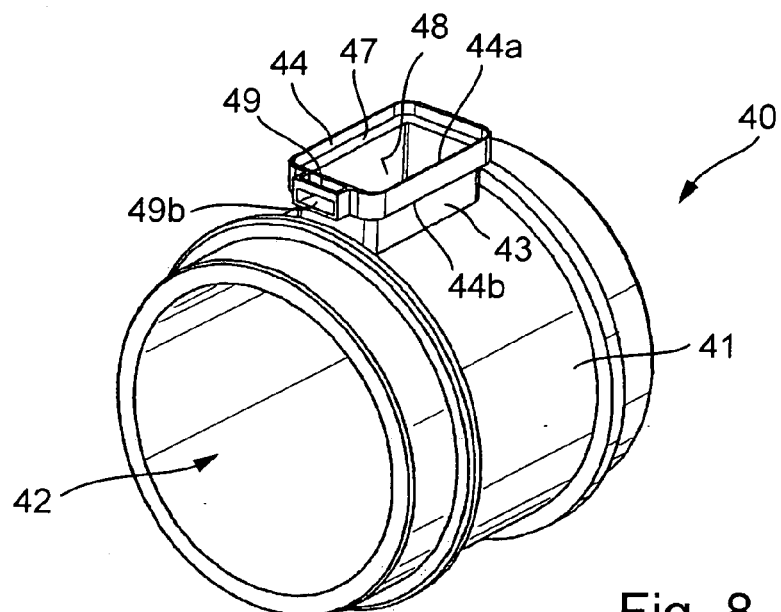

A second embodiment of the securing part 30 is shown in FIGS. 6a–6d. The securing part 30 is formed as a synthetic plastic part and has a surface 68, form which a front wall 39 and a side wall 36a, 36b project perpendicularly. Slots 37a, 37b are provided in the side walls 36a, 36b, and the webs 32a, 32b are arranged in them. The webs 32a, 32b and an arresting hook 33 extend perpendicular to the surface 38 from the front wall 39. During insertion of the securing part 30 onto the flange 44 of the connecting pipe 43, the arresting hook 43 engages in the opening 39 and expands behind the counter arresting means 49b arranged in the opening 49 as barbs, as shown in FIG. 8. Simultaneously, the webs 32a, 32b of the securing part 30 engage in the hook-shaped holding means 65a, 65b of the leg ends of the holding part 60, and thereby the holding part 60 is secured against pulling out from the flange 44. The front wall 39 of the securing part 30 covers the projection with the opening 39, so that a release of the arresting hook 33 is not possible. Advantageously, in this embodiment a dismounting of the plug sensor from the fluid conduit part is possible only by destruction of the securing part 30, to exclude a manipulation with the plug sensor.

It will be understood that each of the elements described above, or two or more together, may also find a useful application in other types of constructions differing from the types described above.

While the invention has been illustrated and described as embodied in device for determining at least one parameter of a medium flowing in a conduit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claim is:

1. A device for determining at least one parameter of a medium which flows in a conduit, comprising a fluid conduit part having a wall which forms a fluid conduit passage and has an insertion opening; a plug sensor having a sensor element, an insertion portion which is inserted through said insertion opening of said wall into said fluid conduit passage, an electrical connection portion which is not inserted into said fluid conduit passage, and a stop surface arranged so that an insertion movement of said insertion portion is limited by abutment of said stop surface against a stop surface of said fluid conduit part; and mounting means for mounting said plug sensor on said fluid conduit part, said mounting means including a holding part which is pushed substantially perpendicular to an insertion direction of said plug sensor onto a connecting pipe of said fluid conduit part, which surrounds said insertion opening, said holding part having at least one first portion, abutting against a supporting surface of said connecting pipe and at least one second portion applying a pretensioning force caused by said holding part to a securing surface of said plug sensor which faces away from said insertion portion of said plug sensor, so that said stop surface of said plug sensor is pressed against said stop surface of said fluid conduit part, wherein said holding part has at least one leg which engages said securing surface and is inserted substantially perpendicular to an insertion direction of said plug sensor into guiding means of said connecting pipe, wherein said holding part has two said legs which are connected with one another by a connecting web.

2. A device as defined in claim 1, and further comprising a securing part arranged on said connecting pipe and engageable with said at least one leg of said holding part inserted in said guiding means, so that said holding part is secured against pulling from said connecting pipe.

3. A device as defined in claim 2, wherein said securing part is mounted non-releasably on said connecting pipe by arresting means arrestable in counter arresting means provided on said connecting pipe.

4. A device as defined in claim 2, wherein said holding part has another leg, and wherein said legs have ends provided with said holding means in which engaging means of said securing part are engageable.

5. A device as defined in claim 4, wherein said holding means of said ends of said legs are formed as means selected from the group consisting of lugs and hooks, while said engaging means of said securing part are formed as means selected from the group consisting of projections and hooks.

6. A device for determining at least one parameter of a medium which flows in a conduit, comprising a fluid conduit part having a wall which forms a fluid conduit passage and has an insertion opening; a plug sensor having a sensor element, an insertion portion which is inserted through said insertion opening of said wall into said fluid conduit passage, an electrical connection portion which is not inserted into said fluid conduit passage, and a stop surface arranged so that an insertion movement of said insertion portion is limited by abutment of said stop surface against a stop surface of said fluid conduit part; and mounting means for mounting said plug sensor on said fluid conduit part, said mounting means including a holding part which is pushed substantially perpendicular to an insertion direction of said plug sensor onto a connecting pipe of said fluid conduit part, which surrounds said insertion opening, said holding part having at least one first portion abutting against a supporting surface of said connecting pipe and at least one second portion applying a pretensioning force caused by said holding part to a securing surface of said plug sensor which faces away from said insertion portion of said plug sensor, so that said stop surface of said plug sensor is pressed against said stop surface of said fluid conduit part, wherein said holding part has at least one leg which engages said securing surface and is inserted substantially perpendicular to an insertion direction of said plug sensor into guiding means of said connecting pipe, wherein said connecting pipe has a slot which forms said guiding means for said at least one leg of said holding part.

7. A device for determining at least one parameter of a medium which flows in a conduit comprising a fluid conduit part having a wall which forms a fluid conduit passage and has an insertion opening; a plug sensor having a sensor element, an insertion portion which is inserted through said insertion opening of said wall into said fluid conduit passage, an electrical connection portion which is not inserted into said fluid conduit passage, and a stop surface arranged so that an insertion movement of said insertion portion is limited by abutment of said stop surface against a stop surface of said fluid conduit part; and mounting means for mounting said plug sensor on said fluid conduit part, said mounting means including a holding part which is pushed substantially perpendicular to an insertion direction of said plug sensor onto a connecting pipe of said fluid conduit part, which surrounds said insertion opening, said holding part having at least one first portion abutting against a supporting surface of said connecting pipe and at least one second portion applying a pretensioning force caused by said holding part to a securing surface of said plug sensor which faces away from said insertion portion of said plug sensor, so that said stop surface of said plug sensor is pressed against said stop surface of said fluid conduit part, wherein said holding part has at least one leg which engages said securing surface and is inserted substantially perpendicular to an insertion direction of said plug sensor into guiding means of said connecting pipe, wherein said connecting pipe has a flange, said at least one leg of said holding part having a first portion for abutment against said securing surface of said plug sensor and a second portion engaging with said flange.

8. A device as defined in claim 7, wherein said first portion of said leg has spring elements which abut with pretensioning against said securing surface.

9. A device as defined in claim 7, wherein said second portion of said leg has spring elements which abut with pretensioning against a flange surface of said flange that faces toward said fluid conduit part.

10. A device for determining at least one parameter of a medium which flows in a conduit, comprising a fluid conduit part having a wall which forms a fluid conduit passage and has an insertion opening; a plug sensor having a sensor element, an insertion portion which is inserted through said insertion opening of said wall into said fluid conduit passage, an electrical connection portion which is not inserted into said fluid conduit passage, and a stop surface arranged so that an insertion movement of said insertion portion is limited by abutment of said stop surface against a stop surface of said fluid conduit part; and mounting means for mounting said plug sensor on said fluid conduit part, said mounting means including a holding part which is pushed substantially perpendicular to an insertion direction of said plug sensor onto a connecting pipe of said fluid conduit part, which surrounds said insertion opening, said holding part having at least one first portion abutting against a supporting surface of said connecting pipe and at least one second portion applying a pretensioning force caused by said holding part to a securing surface of said plug sensor which faces away from said insertion portion of said sensor, so that said stop surface of said plug sensor is pressed against said stop surface of said fluid conduit part, wherein said holding part is formed as a punched bent part.

* * * * *